US011551250B2

(12) United States Patent
Kohli et al.

(10) Patent No.: US 11,551,250 B2
(45) Date of Patent: Jan. 10, 2023

(54) PAYMENT PROCESSING SYSTEM FOR APPLYING MERCHANT PROMOTIONS TO A PUSH PAYMENT TRANSACTION

(71) Applicant: MASTERCARD INTERNATIONAL INCORPORATED, Purchase, NY (US)

(72) Inventors: Manoneet Kohli, White Plains, NY (US); Shane Lansley Jorge Deniz, Ardsley, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 323 days.

(21) Appl. No.: 16/400,941

(22) Filed: May 1, 2019

(65) Prior Publication Data

US 2020/0349598 A1 Nov. 5, 2020

(51) Int. Cl.
G06Q 30/02 (2012.01)
G06Q 20/42 (2012.01)
G06Q 20/40 (2012.01)
G06Q 20/10 (2012.01)

(52) U.S. Cl.
CPC ....... *G06Q 30/0215* (2013.01); *G06Q 20/102* (2013.01); *G06Q 20/4037* (2013.01); *G06Q 20/42* (2013.01)

(58) Field of Classification Search
CPC ............... G06Q 30/0215; G06Q 20/42; G06Q 20/4037; G06Q 20/102; G06Q 20/387; G06Q 20/085; G06Q 20/32; G06Q 20/401
See application file for complete search history.

(56) References Cited

U.S. PATENT DOCUMENTS

| 8,606,662 B2 * | 12/2013 | Tomchek | G06Q 30/0283 705/17 |
| 2004/0117225 A1 * | 6/2004 | Fridman | H04L 67/00 705/14.64 |

(Continued)

OTHER PUBLICATIONS

Wiley Encyclopedia of Computer Science and Engineering (Year: 2009).*

*Primary Examiner* — Breffni Baggot
(74) *Attorney, Agent, or Firm* — Armstrong Teasdale LLP (57) ABSTRACT

Described herein is a computing device for applying merchant promotions to a push payment transaction. The computing device includes a processor and a memory. The processor is configured to receive a promotion request message. The promotion request message includes a merchant ID and an initial push payment transaction amount. The processor retrieves, from the memory, a merchant promotion and applies the retrieved merchant promotion to an initial transaction amount to determine an updated transaction amount. The processor then transmits a promotion response message, receives an authorization message and initiates a transfer of funds. The promotion response message includes the merchant ID and the updated transaction amount. The authorization message authorizes the push payment transaction in the updated transaction amount. The funds are transferred in the updated payment amount from the user account with the originating institution to the merchant account at the receiving institution.

20 Claims, 6 Drawing Sheets

(56) References Cited

U.S. PATENT DOCUMENTS

| | | | |
|---|---|---|---|
| 2013/0218664 A1* | 8/2013 | Carlson | G06Q 30/0244 |
| | | | 705/14.43 |
| 2014/0025457 A1* | 1/2014 | Martinez | G06Q 30/0207 |
| | | | 705/14.23 |
| 2015/0242941 A1 | 8/2015 | Viswanath et al. | |
| 2015/0269600 A1* | 9/2015 | Randle | G06Q 30/0207 |
| | | | 705/14.14 |
| 2016/0104155 A1* | 4/2016 | McGaugh | G06Q 20/405 |
| | | | 705/65 |
| 2016/0224967 A1 | 8/2016 | Davis et al. | |
| 2017/0032290 A1* | 2/2017 | Ford | G06Q 10/087 |
| 2017/0206593 A1* | 7/2017 | Zolotov | G06Q 30/0639 |
| 2017/0300873 A1 | 10/2017 | Krishna | |
| 2018/0039972 A1* | 2/2018 | Meaney | G06Q 20/322 |
| 2018/0276658 A1 | 9/2018 | Liscia et al. | |
| 2018/0293562 A1* | 10/2018 | Squire | G06Q 20/3276 |
| 2019/0087815 A1 | 3/2019 | Goldschmidt | |
| 2019/0147482 A1* | 5/2019 | Jain | G06Q 20/322 |
| | | | 705/14.1 |

\* cited by examiner

PAYMENT PROCESSING SYSTEM FOR APPLYING MERCHANT PROMOTIONS TO A PUSH PAYMENT TRANSACTION

BACKGROUND

The field of the present disclosure relates generally to processing push payment transactions over a payment processing network and, more particularly, to systems and methods for applying merchant promotions to a push payment transaction.

At least some electronic push payment transactions (e.g., peer-to-peer payments or buyer-initiated payments) differ from traditional payment transactions (e.g., pull payments) in that push payments are made as a credit transfer from a payor's (e.g., consumer) account at an originating institution directly to a receiver's (e.g., merchant or vendor) account at a receiving institution. In a pull payment transaction, a payor's account is debited in the payment transaction amount and funds are pulled from the payor's account to the receiver's account. In both pull and push payments, the payor initiates and approves a payment; however, push payment transactions are processed in real-time (or near real-time), and the funds are directly deposited into the receiver's account. Wire payments and direct deposits are examples of push payments transactions.

At least some known electronic push payment transactions are less risky than pull payment transactions because a push payment is only executed if the payor has sufficient funds in their account at the originating institution. In a pull payment transaction, the receiver has no guarantee that the payor has sufficient funds in their account increasing the risk to the receiver.

Further, at least some known merchants, particularly small businesses and "mobile" merchants (e.g., food trucks) struggle with cash-flow issues. For example, a merchant may incur more expenses (e.g., overhead, payroll, etc.) than actual funds collected from sales over a period of time. Thus, at least some known merchants may benefit from push payment transactions, as funds are deposited into the merchant account at the receiving institution in real time (e.g., hours/days) as opposed to pull payments, which generally take longer for funds to be deposited (e.g., days/weeks). This improved payment timeline may alleviate cash-flow issues.

Push payments allows merchants access to their funds on a much quicker timeline thereby improving cash flow issues and reducing the need for drawing a line of credit. The advantages of push payment transactions are readily apparent for small businesses, mobile merchant, or any other type of merchant. However, the payor may have little incentive to participate in push payment transactions.

Moreover, current card-linked promotions or loyalty programs are generally associated with pull payment systems. In particular, in a pull payment system, transactions eligible for card-linked promotions are initiated in the full amount, and merchants provide instructions to issuers to apply discounts or other promotions as credits on a cardholder's statement. Known push payment systems cannot implement these card-linked promotions, because in a push payment, the full amount of the transaction would be subtracted from the payor's account in real-time, before any merchant discount instruction to the issuer could be applied.

BRIEF DESCRIPTION

In one aspect, a computing device for applying merchant promotions to a push payment transaction is provided. The computing device includes a processor and a memory, and the processor is configured to receive a promotion request message, the promotion request message including a merchant ID and an initial push payment transaction amount. The promotion request message is transmitted by a mobile device associated with a user, wherein the user has a user account with an originating institution. The processor is also configured to retrieve, from the memory, a merchant promotion associated with a merchant identified by the merchant ID. The memory includes a table associating merchant IDs with merchant promotions, and wherein the merchant has a merchant account at a receiving institution. The processor is further configured to apply the retrieved merchant promotion to the initial push payment transaction amount to determine an updated transaction amount, transmit a promotion response message to the mobile device, the promotion response message including the merchant ID and the updated transaction amount, receive an authorization message from the mobile device, the authorization message authorizing the push payment transaction having the updated transaction amount, and initiate a transfer of funds in the updated transaction amount from the user account with the originating institution to the merchant account at the receiving institution.

In another aspect, a push payment promotion system for applying promotions to push payment transactions is provided. The push payment promotion system includes a database storing a plurality of merchant records associated with a respective plurality of merchants, wherein each merchant has a merchant account with a receiving institution, and wherein each of the merchant records includes a merchant ID associated with the respective merchant and a merchant promotion applicable to push payment transactions initiated with the respective merchant. The push payment promotion system also includes a computing device communicatively coupled to the database and a mobile device associated with a user, wherein the mobile device is configured to facilitate a push payment transaction initiated by a user, wherein the user has a user account with an originating institution. The computing device is configured to receive a promotion request message, the promotion request message including a merchant ID and an initial push payment transaction amount. The promotion request message is transmitted by a mobile device associated with a user, wherein the user has a user account with an originating institution. The computing device is also configured to retrieve, from the database, a merchant promotion associated with a merchant identified by the merchant ID, wherein the merchant has a merchant account at a receiving institution, apply the retrieved merchant promotion to the initial push payment transaction amount to determine an updated transaction amount, and transmit a promotion response message to the mobile device, the promotion response message including the merchant ID and the updated transaction amount. The computing device is further configured to receive an authorization message from the mobile device, the authorization message authorizing the push payment transaction in the updated transaction amount, transmit a promotion response message to the mobile device, the promotion response message including the merchant ID and the updated transaction amount, and initiate a transfer of funds in the updated transaction amount from the user account with the originating institution to the merchant account at the receiving institution.

In a further aspect, a non-transitory computer-readable storage medium that includes computer-executable instructions for applying a merchant funded promotion to a push payment is provided. When executed by a computing device including a processor in communication with a memory device, the computer-executable instructions cause the processor to receive a promotion request message, the promotion request message associated with a push payment transaction initiated by a user and including a merchant ID and an initial push payment transaction amount. The promotion request message is transmitted by a mobile device associated with the user, wherein the user has a user account with an originating institution. The computer-executable instructions also cause the processor to retrieve, from the memory device, a merchant promotion associated with a merchant identified by the merchant ID. The memory device includes a table associating merchant IDs with merchant promotions, and the merchant has a merchant account at a receiving institution. The computer-executable instructions further cause the processor to apply the retrieved merchant promotion to the initial push payment transaction amount to determine an updated transaction amount, transmit a promotion response message to the mobile device, the promotion response message including the merchant ID and the updated transaction amount, receive an authorization message from the mobile device, the authorization message authorizing the push payment transaction in the updated transaction amount, and initiate a transfer of funds in the updated transaction amount from the user account with the originating institution to the merchant account at the receiving institution.

BRIEF DESCRIPTION OF THE DRAWINGS

FIGS. 1-6 show example embodiments of the methods and systems described herein.

DETAILED DESCRIPTION

The systems and methods described herein are directed to applying merchant promotions to a push payment transaction (e.g., real time payments or buyer-initiated payments). Push payment transactions transfer funds in real-time from a customer's (also referred to herein as a payor, user, or cardholder) account at a financial institution (also referred to herein as an originating institution) directly to a receiver's (e.g., merchant, vendor, etc.) account at a financial institution (also referred to herein as a receiving institution). A customer may utilize a mobile device to facilitate the push payment transaction over a payment processing network in connection with a push payment promotion system. In some embodiments, the mobile device executes a mobile payment application ("app") to complete the push payment transaction with the push payment promotion system. In some embodiments, the mobile payment application is a wallet app (e.g., mobile wallet, e-wallet, and/or digital wallet) and in other embodiments, the mobile payment application is an originating institution mobile payment application, maintained by or associated with the customer's financial institution (e.g., the originating institution or "issuer" of the customer's financial account). At least some known mobile payment applications store a user's payment information such as; a credit or debit card number, a bank account number, primary account number (PAN), payment token, encrypted or tokenized PAN, user log-in information corresponding to saved payment credentials, etc. The mobile device may also be used to transmit and receive a plurality of notifications (e.g., text/SMS messages, email, mobile push notifications) with the push payment promotion system in order to complete the push payment transaction.

In one example embodiment, a participating merchant may be enrolled with the push payment promotion system and enabled to receive funds via push payments after an enrollment or registration process. During an enrollment or registration process, the merchant provides the push payment promotion system with an enrollment record. The enrollment record may include a merchant ID associated with the merchant enrolling with the push payment promotion system and/or information associated with the merchant's financial institution (e.g., the receiving institution or "acquirer" of the merchant's financial account). The push payment promotion system stores the enrollment record in a storage location (e.g., a remote database and/or a local memory location) where the information in the enrollment record is indexed according to the merchant ID for efficient retrieval. The merchant ID may have one format or value (e.g., an alphanumeric value) and/or may have a plurality of equivalent variants (e.g., a string of letters representing the merchant's name that is equivalent to a string of numbers representing the merchant within the payment processing network).

The merchant also provides the push payment promotion system with a merchant record. The merchant record may include current merchant promotion details and/or a current merchant location. The push payment promotion system stores the merchant record in a storage location where the information in the merchant record is indexed according to the merchant ID for efficient retrieval. The merchant record may be stored in the same location as the enrollment record. The merchant may update the merchant record with the push payment promotion system as frequently as necessary so the push payment promotion system is up to date with active promotions and current locations. For example, a mobile merchant, such as a food truck, may have a semi-permanent location, and the mobile merchant may be currently running a promotion. The mobile merchant provides the push payment promotion system with the semi-permanent location and details about the current promotion. In some embodiments, the mobile merchant may change locations frequently (e.g., hourly/daily). Therefore, the mobile merchant may provide an updated merchant record, reflecting ongoing promotions and current locations, frequently (e.g., hourly/daily) to the push payment promotion system.

The push payment promotion system is configured to provide information about current merchant promotions and/or a current merchant location to a user. In some embodiments, the push payment promotion system may be communicatively coupled to the mobile computing device via the mobile payment application, such that the push payment promotion system may receive an information request message from the mobile device via the mobile payment application, the information request message may include a merchant ID. The push payment promotion system parses the merchant ID from the information request message, and queries a database with the merchant ID to retrieve any associated information, such as current merchant promotions and/or a current merchant location associated with the merchant having the merchant ID. The push payment promotion system may further transmit an information response message including the retrieved current merchant promotion and/or current merchant location of the merchant associated with the merchant ID to the mobile computing device via the mobile payment application. The mobile payment application may then display the message received from the push payment promotion system such that a user may access current promotions or current merchant locations on the mobile payment application executed on the mobile device.

In other embodiments, a user may exchange a plurality of text messages with the push payment promotion system to determine a merchant's current promotions and/or a merchant's current location. For example, a user may transmit an inquiry message to the push payment promotion system asking a question relating to a merchant location and/or asking if the merchant has a current promotion. The "question" may be formatted as a predetermined code or string, such as "location of XYZ." The push payment system identifies a merchant ID from the inquiry message and determines the merchant's location and/or current promotion details as described above. The user may then receive a response message from the push payment promotion system, wherein the response message indicates the merchant's location and/or whether the merchant has any current promotions.

A push payment transaction may be initiated by the user using the mobile payment application in connection with the push payment promotion system. The user accesses the mobile application while at or proximate to a participating merchant. The user may input various identification credentials, such as a username and password, biometric factor such as finger print, and/or personal identification number (PIN), to the mobile payment application to access the mobile payment application.

The user may provide a merchant identifier of the merchant to the mobile payment application, such as by scanning a QR code. In some embodiments, the merchant may present the QR code to the user, such that the user may scan the QR code using the mobile payment application. The QR code includes, encodes, or represents the merchant identifier (ID) associated with the participating merchant. The user also inputs details relating to an initial push payment transaction occurring at the participating merchant into the mobile payment application. This "initial transaction data" includes at least an initial payment amount associated with the initial push payment transaction (e.g., a total payment amount for the purchase of goods and/or services from the merchant). The user then initiates the push payment transaction within the mobile payment application. In some embodiments, the user may need to re-input certain credentials, such as providing a finger print within the mobile payment application in order to initiate the transaction.

The mobile payment application transmits a promotion request message to the push payment promotion system. The promotion request message includes the initial transaction data and the merchant ID. In other embodiments, a user may transmit the promotion request message as a text message to the push payment promotion system using the mobile device. The text message may contain information representing the merchant ID and initial transaction data.

The push payment promotion system accesses a database of stored merchant records to determine whether the merchant ID is associated with a valid or enrolled merchant. If the merchant ID is valid, the push payment promotion system accesses the merchant record to determine whether there is a current promotion or promotions. The push payment promotion system may then apply any current merchant promotions associated with the merchant ID to the initial payment amount in order to generate an updated payment amount. The push payment promotion system may then transmit a fund verification request including the updated payment amount to the mobile payment application and/or to the originating bank associated with the user's mobile payment application. When the fund verification request is sent to the mobile payment application, the mobile payment application initiates a fund verification process with the originating bank. The push payment promotion system accesses the database and transmits the fund verification request in real-time (or near real-time), such that the time between receiving a promotion request message and sending a verification request may occur in less than a minute (e.g., a few seconds). When the fund verification request is sent directly to the originating bank, the originating bank initiates the fund verification process automatically. The originating bank accesses the user's account to determine whether there are sufficient funds available to complete the push payment transaction having the updated payment amount. If there are sufficient funds available, the originating bank debits the user's account and transfers funds in the updated payment amount directly from the user's account to a merchant account at a receiving bank. The push payment transactions are processed in real-time (or near real-time), and the funds are directly deposited into the merchant's account within seconds to minutes. In some embodiments, the push payment transactions are processed (e.g., funds are transferred electronically) within a minute (e.g., a few seconds) of initiation of the transaction, and. Timely user response message to the fund verification request may contribute to the push payment transaction processing time.

At least one technical problem to be solved the systems and methods provided herein includes: (i) inability of merchants to provide direct incentives, in the form of merchant funded promotions, to users to encourage users to engage in a push payment transaction with the merchant; (ii) inability of merchant's to receive push payments; (iii) difficulty providing users with updated/current merchant location and/or merchant promotions.

The technical effects of the systems and methods described herein may be achieved by performing at least some of the following steps: (i) receive a promotion request message including a merchant ID and an initial payment transaction amount (ii) retrieve, from the memory, a merchant promotion associated with the merchant ID, (iii) apply retrieved merchant promotion to the initial transaction amount to determine an updated transaction amount, (iv) transmit a promotion response including the updated transaction amount, (vi) receive an authorization message authorizing the push payment transaction, and (vii) initiate an electronic transfer of funds in the updated payment amount from the originating institution to the receiving institution.

A technical effect or improvement provided by the systems and processes described herein include at least one of: (i) enabling merchants to provide promotions using push-payment systems, (ii) real-time application (e.g., "on-the-fly") of merchant-funded promotions to push payment transactions, decreasing the overall time to complete the transaction, wherein funds are deposited in the merchant account in considerably less time than pull payment transactions, (iii) increasing the incentive of a user to participate in push payment transaction with a merchant, the push payment transactions being a more reliable payment transaction because fund confirmation is performed during the transaction, thereby decreasing the number of fraudulent purchase transactions, (iv) providing information (e.g., location services) relating to the merchant to the consumer, such as promotions and merchant locations of mobile merchants, (v) more secure push payment transactions, and (vi) fewer messages exchanged over a payment processing network for completing a push payment transaction.

As used herein, a processor may include any programmable system including systems using micro-controllers, reduced instruction set circuits (RISC), application specific integrated circuits (ASICs), logic circuits, and any other circuits or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and thus are not limiting as to the types of memory usable for saving of a computer.

In one embodiment, a computer program is provided, and the program is embodied on a computer readable medium. In an example embodiment, the data optimization system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
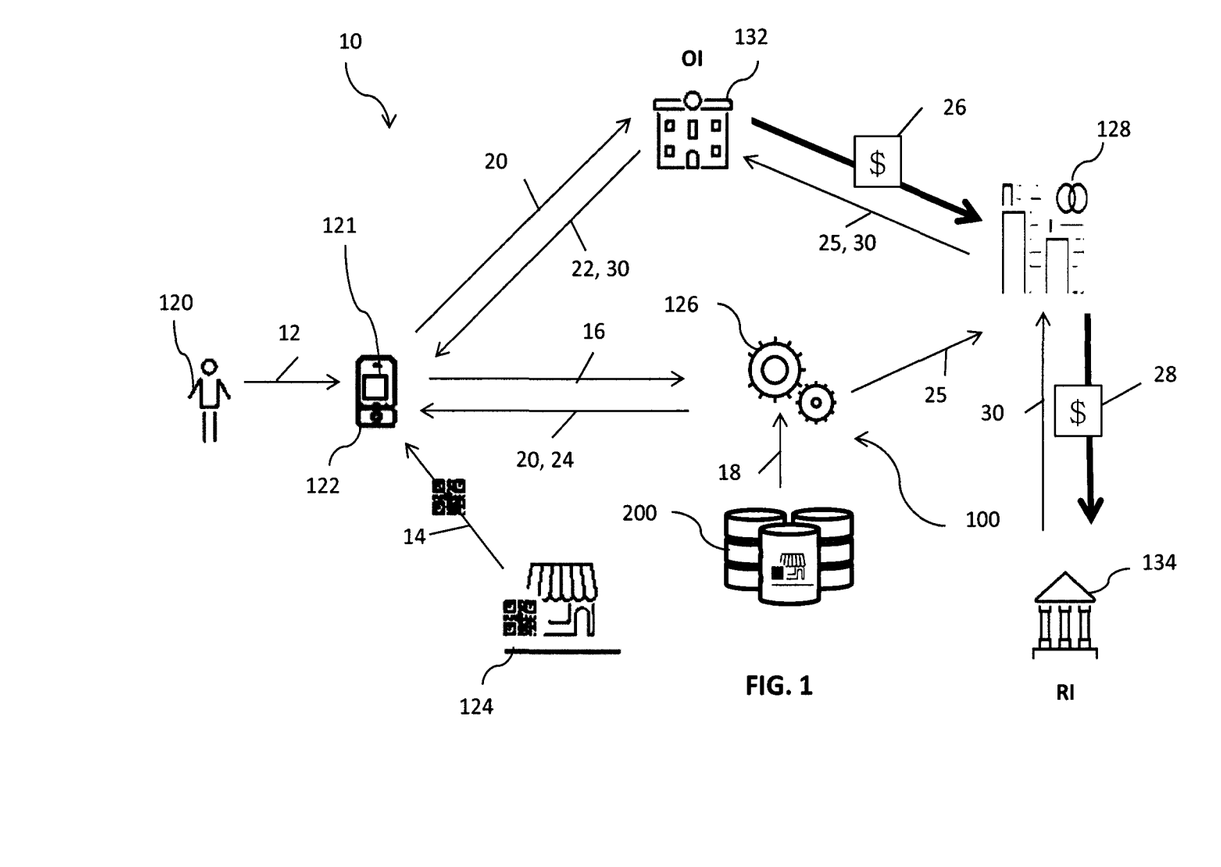
FIG. 1 is a simplified schematic diagram of an example push payment promotion process flow between components of a push payment promotion system including a push payment computing device for applying a merchant promotion to a push payment transaction.

FIG. 1 is a schematic diagram of an example process flow 10 using a push payment promotion system 100 in accordance with the present disclosure. The example process flow 10 includes the transmission of a plurality of messages and an electronic transfer of funds associated with a push payment transaction initiated by a user 120 (e.g., consumer, payor, etc.) between a mobile device 122 (e.g., a mobile phone, a user's computing device, etc.), a merchant 124 (e.g., a mobile vendor), and a computing device 126 over a payment processing network 128. User 120 has a financial account (e.g., a checking account) at an originating institution 132. Merchant 124 has a financial account (e.g., a business account) at a receiving institution 134.

Figure 2:
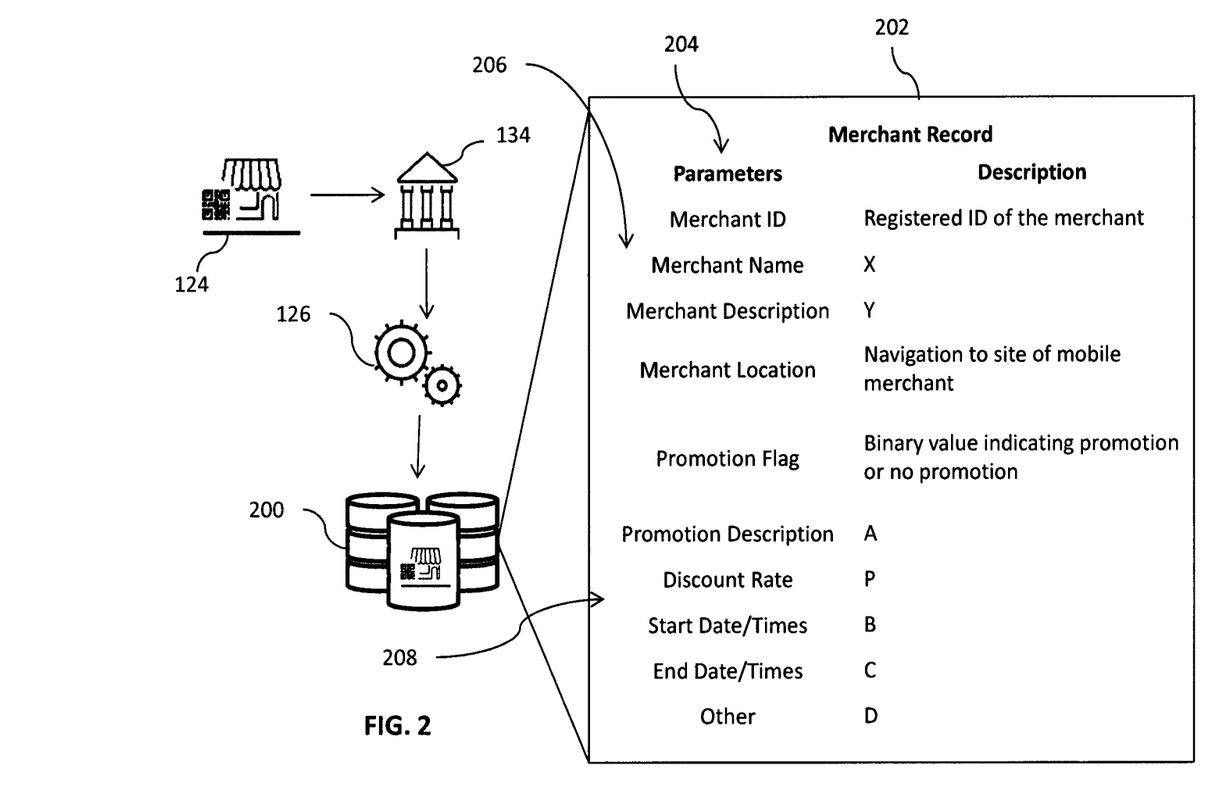
FIG. 2 is a simplified schematic diagram depicting a merchant record for use in the process flow shown in FIG. 1.

Computing device 126, also referred to as a "push payment computing device" for its role in completing push payment as described herein, is communicatively coupled to a merchant database 200 (shown in further detail in FIG. 2). Merchant database 200 includes a plurality of merchant records (e.g., merchant records 202, shown in detail in FIG. 2), each merchant record obtained from a respective merchant (e.g., merchant 124) registered or enrolled with push payment promotion system 100. In some embodiments, each merchant registered with push payment promotion system 100 transmits at least one merchant record to receiving institution 134, and receiving institution 134 transmits the merchant record to push payment promotion system 100. In other embodiments, the merchant may transmit the merchant record directly to push payment promotion system 100. Push payment computing device 126 then populates merchant database 200 by storing the merchant records to a memory. The memory may be integrated to or separate from push payment computing device 126. Each merchant record includes data specific to a particular merchant, including merchant promotion details. Merchant promotion details may include promotion start dates, promotion end dates, discount rates, promotion descriptions, and the like. Merchant records may also include merchant details, for example a merchant identifier (ID), a merchant name, a merchant description, and a merchant location associated with the registered merchant. At least a portion of this data may be provided by the merchant during an enrollment or registration process. Merchant records may be updated frequently (e.g., daily and/or weekly), and push payment computing device 126 updates promotion details and/or merchant details to reflect current promotions and current locations.

As described further herein, push payment computing device 126 is configured access merchant database 200 in order to retrieve a merchant record associated with a merchant at which a push payment transaction is initiated by user 120 via mobile device 122. The push payment transaction may include an initial payment amount associated with one or more purchases. Push payment computing device 126 is configured to apply a current merchant promotion defined in the merchant record to the initial payment amount to calculate an updated payment amount.

The initial payment amount may be associated with one or more items representing either goods or services being purchased by a user (e.g., user 120) at a merchant (e.g., merchant 124). In some embodiments, push payment computing device 126 may apply the merchant promotion to an initial payment amount associated with a single item or with a plurality of items being purchased. For example, a merchant promotion detail may specify a percent payment reduction, and push payment computing device 126 may deduct the percent amount from the initial payment amount associated with a single item or all items included in the purchase. In another example, a merchant promotion detail may specify a payment reduction of a dollar amount for initial payment amounts above a threshold value. Push payment computing device 126 may apply the merchant promotion to the initial payment amount in any manner described in the merchant promotion detail.

Specifically, push payment computing device 126 identifies or generates a set of instructions parsed from the promotion description contained in the merchant record. Push payment computing device 126 may use the instructions to apply the merchant promotion to the initial payment amount. In other words, the promotion description describes how the promotion should be applied to a push payment transaction. For example, the promotion description may instruct push payment computing device 126 to apply a discount rate to the initial payment amount, if the initial payment amount is above a threshold amount and/or if the push payment is initiated within a particular time and/or date range.

Process flow 10 includes user 120 initiating a push payment transaction with merchant 124 using mobile device 122. In some embodiments, the push payment transaction is initiated using a mobile payment application 121 executed on mobile device 122. Mobile payment application 121 is associated with and/or maintained by originating institution 132. User 120 may initiate the push payment transaction by inputting identification credentials 12 into mobile payment application 121 in order to access the user's account information associated with the user's financial account at originating institution 132, wherein the account information may be stored within and/or accessible through mobile payment application 121.

User 120 may obtain a merchant ID 14 from merchant 124. In some example embodiments, merchant 124 may provide user 120 with a QR code. The QR code contains, encodes, or represents merchant ID 14. User 120 may scan the QR code, including or representing merchant ID 14, using mobile payment application 121. Mobile payment application 121 may then transmit a promotion request message 16 to push payment computing device 126 from mobile device 122. Promotion request message 16 may include the QR code, and an initial payment amount associated with the initiated push payment transaction. In some alternative embodiments, user 120 may initiate a push payment transaction by transmitting promotion request message 16 as a text message to push payment promotion system 100.

Push payment computing device 126 may parse the contents of promotion request message 16 to identify merchant ID 14 contained within promotion request message 16. Push payment computing device 126 then queries merchant database 200 using merchant ID 14 to retrieve a merchant record 18. Merchant record 18 is associated with a merchant identified using merchant ID 14 (i.e., merchant 124 with which user 120 has initiated the push payment transaction). Merchant record 18 may include merchant promotion details, including promotion dates/times, promotion rates, and a promotion description. Push payment computing device 126 may determine a set of promotion parameters and apply the promotion parameters to the push payment transaction. Push payment computing device 126 generates an updated payment amount reflecting the merchant promotion.

Push payment computing device 126 then transmits a funding instruction 20 to mobile payment application 121. Funding instruction 20 includes the updated payment amount. Mobile payment application 121 transmits funding instruction 20 to originating institution 132. Originating institution 132 accesses the user's account to determine whether there are sufficient funds available in the user's account to complete the push payment transaction in the updated payment amount. In alternative embodiments, push payment computing device 126 may transmit funding instruction 20 to payment processing network 128. Payment processing network 128 may then transmit funding instruction 20 to originating institution 132. Push payment computing device 126 parses the contents of promotion request message 16 and transmits the funding instructions in real-time (or near real-time) such that the time between receiving promotion request message 16 and sending funding instructions 20 may occur in less than a minute (e.g., a few seconds).

Originating institution 132 transmits a response message 22 to mobile payment application 121. Response message 22 may include at least one of an originating institution approval or an originating institution rejection of the push payment transaction. The originating institution rejection may be associated with originating institution 132 determining that the user's account has insufficient funds to complete the purchase transaction. The originating institution approval message is associated with originating institution 132 determining that there are sufficient funds available in the user's account to complete the push payment transaction. In other example embodiments, originating institution 132 transmits response message 22 to push payment computing device 126. Push payment computing device 126 may then transmit response message 22 to mobile device 122 via a text message.

If response message 22 contains an originating institution rejection, then response message 22 indicates to user 120 that the push payment transaction cannot be completed. If response message 22 contains an originating institution approval, then response message 22 includes the updated payment amount and a prompt for user 120 to confirm or reject the updated payment amount. In one embodiment, mobile payment application 121 transmits an action response message 24 to push payment computing device 126, action response message 24 including user input from user 120 reflecting whether user 120 confirmed or rejected the updated payment amount. In an alternative embodiment, action response message 24 may be transmitted to push payment computing device 126 from mobile device 122 via a text message.

In response to an action response message 24 indicating user 120 confirmed the updated payment account, push payment computing device 126 transmits a funding instruction message 25 to payment processing network 128 for initiating a transfer of electronic funds in the updated payment amount. Payment processing network 128 may then transmit funding instruction message 25 to originating instituting 132.

In response to receiving funding instruction message 25, originating institution 132 debits funds 26 in the updated payment amount from the user's account with originating institution 132. Originating institution 132 may transfer the debited funds in the updated payment amount to receiving institution 134. Alternatively, payment processing network may also transmit funding instruction message 25 to receiving institution 134. In response to receiving funding instruction message 25, receiving institution 134 credits funds 28 into the merchant's financial account with receiving institution 134. Settlement of the actual funds between originating institution 132 and receiving institution 134 may occur at a later date.

Payment processing network 128 may receive a confirmation message 30 from receiving institution 134. Confirmation message 30 includes a confirmation that the push payment transaction was successful (e.g., that receiving institution 134 has received the credited funds 28 and/or has credited funds to the merchant's financial account in advance of later settlement of funds with originating institution 132). Payment processing network 128 subsequently transmits confirmation message 30 to push payment computing device 126 and/or originating institution 132. Push payment computing device 126 and/or originating institution 132 then transmits confirmation message 30 to mobile payment application 121. In an alternative embodiment, payment processing network 128 may transmit confirmation message 30 to push payment computing device 126, and push payment computing device 126 may transmit confirmation message 30 to mobile device 122 via text message. Push payment computing device 126 may transmit confirmation message 30 to merchant 124. In other embodiments, confirmation message 30 may be transmitted to merchant 124 from at least one of receiving institution 134 and/or payment processing network 128. Confirmation message 30 may include the initial payment amount, the updated payment amount, and merchant promotion details. Confirmation message 30 may include any other additional information, including for example and without limitation, item descriptions associated with the goods or services being purchased by user 120 at merchant 124. Merchant 124 may use confirmation message 30 to confirm the push payment transaction is completed.

Referring now to FIG. 2, merchant database 200 stores at least one merchant record 202. Each merchant record 202 is associated with a respective merchant (e.g., merchant 124, shown in FIG. 1) enrolled with push payment promotion system 100 (shown in FIG. 1). An example first merchant record 202 obtained from a first merchant enrolled with the push payment promotion system 100 is shown in detail in FIG. 2. The first merchant may enrolled with push payment promotion system 100 and provide merchant record 202 to receiving institution 134. Receiving institution 134 may then transmit merchant record 202 to push payment computing device 126. In some embodiments, the merchant may provide merchant record 202 directly to push payment computing device 126.

Each merchant record 202 includes a plurality of merchant data fields 204 associated with the merchant. Merchant data fields 204 may include merchant details 206 and merchant promotion details 208. Merchant details 206 may include a merchant ID, merchant names, merchant locations, and merchant descriptions. Merchant promotion details 208 may include promotion start and stop dates and times, promotion descriptions, promotion flag, and promotion rates. Each merchant detail 206 and merchant promotion detail 208 may be populated with a string of characters and/or value. For example, the promotion flag data field may be populated with at least one binary value. The promotion flag may be used by push payment computing device 126 to determine if there is a current promotion available for the merchant associated with the merchant record 202. For example, the promotion flag data field may be populated with a "1" or a "0". The "1" value indicates there is a current promotion available, and the value "0" indicates there is no promotion available. The promotion description data field may be populated with a string of characters indicating how the merchant promotion should be applied to an initiated push payment transaction. The promotion rate data field may be populated with a value "P" representing a percentage that may be used as a discount rate. For example, push payment computing device 126 may multiply the value "P" contained in the promotion rate by the initial payment amount of the push payment transaction and then subtract that result from the initial payment amount.

The merchant location data field may be populated with an address and/or a link to navigation services with directions to the merchant location. In some embodiments, merchants enrolled with push payment promotion system 100 may be mobile merchants (e.g., food trucks, farmer's market vendors, and/or road side stands and the like) or any other type of merchant that may change locations frequently (hourly or daily) or infrequently (weekly or monthly). Merchants may update merchant records 202, merchant locations, and/or promotion details with push payment promotion system 100 as frequently as necessary to update push payment promotion system 100 with the most recent information. Merchant database 200 may include a plurality of merchant records 202 for a single merchant. Merchant database 200 may further include any additional information that enables push payment promotion system 100 to function as described herein. Push payment computing device 126 may store updated merchant records 202 periodically received from the merchants in merchant database 200.

Figure 3:
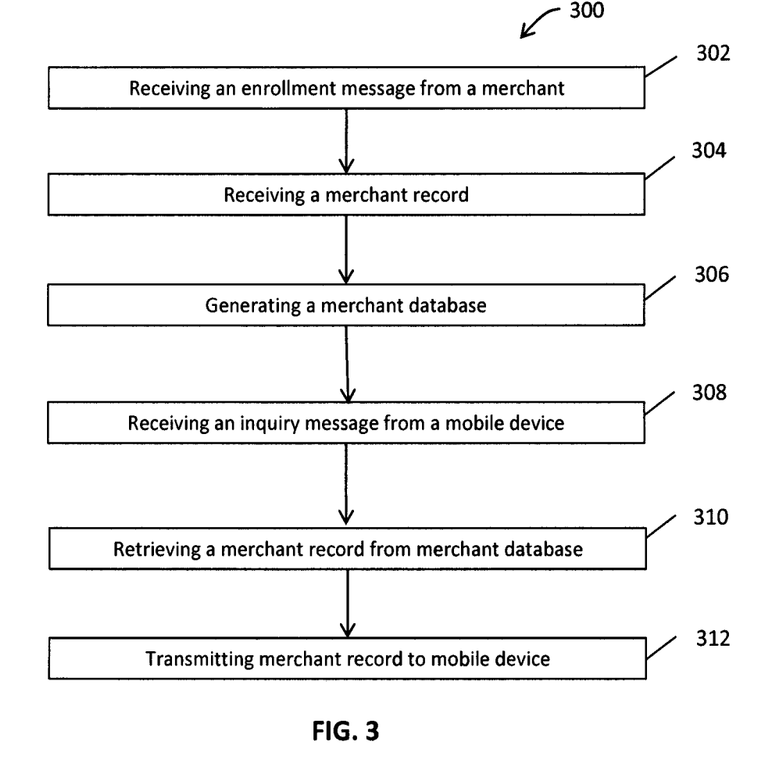
FIG. 3 is a process flow diagram for generating a merchant database used to apply a merchant promotion to a push payment transaction as described in the process flow shown in FIG. 1.

FIG. 3 is a process flowchart of an example method 300 for using stored merchant records to locate mobile merchants or identify current promotions of mobile merchants. Method 300 may be implemented at least in part by push payment computing device 126 (shown in FIG. 1).

Method 300 includes receiving 302 an enrollment message from a first merchant (e.g., merchant 124) enrolling with push payment promotion system 100. Enrollment message (e.g., a registration message) may include an authorization from the first merchant allowing push payment promotion system 100 to apply approved merchant funded promotions to push payment transactions occurring with or at the first merchant. The enrollment message may include an enrollment record. The enrollment record may include a merchant ID associated with the merchant enrolling with the push payment promotion system and/or information associated with the merchant's financial institution (e.g., the receiving institution or "acquirer" of the merchant's financial account). Method 300 further includes receiving 304 at least one merchant record (e.g., merchant record 202, shown in FIG. 2) from the first merchant previously enrolled with push payment promotion system 100. The merchant record includes merchant promotion details (e.g., merchant promotion details 206) and merchant details (e.g., merchant details 208) associated with the first merchant. The promotion details includes promotions start dates/times, promotion end dates/times, promotion rates, and promotion description.

The merchant details may include merchant name, merchant ID, and merchant locations. Method 300 may receive a merchant record as frequently as necessary as to update push payment promotion system 100 with current merchants promotion details and/or current merchant details.

Method 300 also includes generating 306 a merchant database (e.g., merchant database 200, shown in FIGS. 1 and 2). Generating 306 the merchant database includes storing the at least one merchant record to a memory. The memory may be integral to push payment computing device 126 or may be separate from push payment computing device 126 (as shown in FIG. 1). Each merchant record is identifiable with a merchant ID associated with the merchant, such that push payment computing device 126 may retrieve a merchant record from the memory by identifying the merchant ID associated with the merchant. For example, push payment computing device 126 may look up the merchant record using the merchant ID associated with the merchant.

Method 300 further includes receiving 308 an inquiry message from a mobile device (e.g., mobile device 122). The inquiry message may include a merchant ID associated with a merchant enrolled with push payment promotion system 100 and an inquiry about the merchant promotions and/or merchant details. For example, the inquiry may include "Where is the merchant located?" or "Are there any promotions?" For example, user 120 may transmit an inquiry text message via the mobile device to push payment promotion system 100 in order to determine at least one of a merchant promotion details or a merchant detail. In other embodiments, the mobile device may include a mobile payment application executed thereon. The mobile payment application may automatically receive merchant details and merchant promotions from push payment promotion system 100 and the mobile payment application may automatically update and display the merchant details and merchant promotion details. For example, a user may access the mobile payment application executed on the mobile device to look up any current promotions and/or to determine the current location of a mobile merchant.

Method 300 further includes retrieving 310 a merchant record from the memory in response to inquiry message received 304 from a mobile device. The computing device may use the merchant ID contained in the inquiry message to look up and retrieve a merchant record associated with the merchant ID.

Method 300 further includes transmitting 312 the merchant record to the mobile device. In some embodiments, transmitting 312 includes the computing device text messaging the mobile device with a message indicating the merchant promotion and/or the merchant details contained in the merchant record. In other embodiments, transmitting includes push payment computing device 126 transmitting merchant record to a mobile payment application executed on the mobile device. The mobile application may display merchant promotion details and/or merchant details on the mobile payment application executed on the mobile device. For example, user 120 may access the mobile payment application executed on the mobile device to determine the current location of a merchant or to determine if the merchant has any available promotions. The computing device receiving 308 an inquiry message, retrieving 310 a merchant record, and transmitting 312 the merchant record occurs in real-time (or near real-time) such that the time between receiving 308 and transmitting 312 may occur in less than a minute (e.g., a few seconds).

Figure 4:
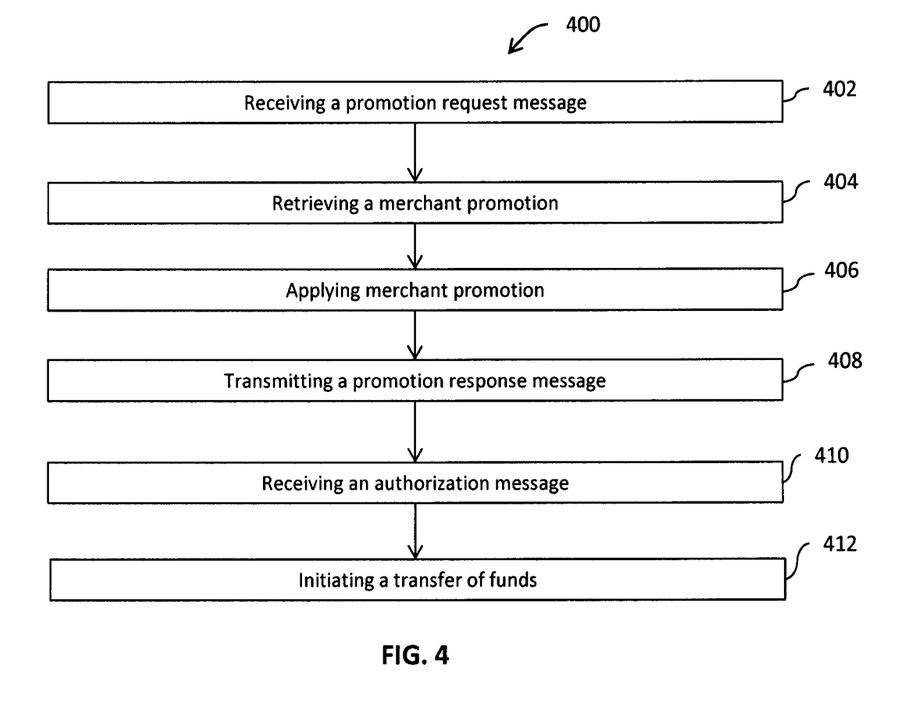
FIG. 4 illustrates an example system configuration of the push payment process flow shown in FIG. 1.

FIG. 4 is a process flow chart of an example method 400 for applying a merchant funded promotion to an initial push payment transaction using a computing device (e.g., push payment computing device 126, shown in FIG. 1) in communication with a merchant database (e.g., merchant database 200, shown in FIGS. 1 and 2). Method 400 includes receiving 402 a promotion request message from a mobile device (e.g., mobile device 122). In some embodiments, the promotion request message may be received from the mobile device via a text message. In some other embodiments, the promotion request message may be received from a mobile payment application (e.g., mobile payment application 121) executed on the mobile device. The promotion request message may contain a merchant ID. In some embodiments the merchant ID may be included in, encoded in, or represented by a QR code. For example, the QR code may be scanned using the mobile payment application and the mobile payment application may transmit the promotion request message including the QR code. The promotion request message may also contain a user's identification credentials associated with the user's payment information and an initial push payment transaction. The initial push payment transaction includes an initial payment amount associated with the initial push payment transaction.

Method 400 further includes the retrieving 404 a merchant promotion detail (e.g., merchant promotion detail 208) contained in a merchant record (e.g., a merchant record 202, shown in FIG. 2) from a merchant database (e.g., merchant database 200). Retrieving 404 includes accessing the memory (i.e., merchant database 200) to retrieve the merchant record saved therein (e.g., retrieve from the memory 502, shown in FIG. 5). The memory may be integral the computing device or may be separate from the computing device. The merchant record may be retrieved from the merchant database using the merchant ID contained in the promotion request message received from the mobile device. The merchant record may include merchant data fields (e.g., merchant data fields 204). The merchant data fields may include merchant details (e.g., merchant details 206) and merchant promotion details (e.g., merchant promotion details 208).

The computing device may determine if there is a current promotion available for the merchant, using information contained in the merchant record. The merchant promotion details may include a promotion flag data field. The promotion flag data field may be populated with at least one of a binary value indicating whether a promotion is available. For example, the promotion flag data field may be populated with a "1" or a "0". The "1" value indicates there is a current promotion available, and the value "0" indicates there is no promotion available. If the binary value populating the promotion flag data field indicates no promotions are available then the computing device transmits a rejection message to the mobile device via the mobile payment application or via text message. The rejection message indicates to a user that no promotion is available.

If the binary value contained in the promotion flag indicates that a promotion is available, then method 400 continues to applying 406 the retrieved merchant promotion to determine an updated payment amount. Specifically, the computing device applies a current merchant promotion defined in the merchant record to the initial payment amount to calculate an updated payment amount. For example, this calculating may include applying a percent deduction to the initial payment amount and/or subtracting a set amount from the initial payment amount if the initial payment amount is above a threshold. In alternative embodiments, the computing device applies the current merchant promotion in any manner defined in the merchant record to the initial payment amount to calculate an updated payment amount.

Method 400 further includes transmitting 408 a promotion response message. Transmitting 408 includes the computing device transmitting 408 a promotion response message to the mobile device. The promotion response message includes the merchant ID and the updated transaction amount. In some embodiments, the promotion response message may be transmitted directly to the originating institution. The mobile device may then transmit the promotion response message to the originating institution. In some embodiments, the promotion response message may be transmitted by the mobile payment application executed on the mobile device. In some embodiments, the mobile device may transmit the promotion response message via text message to the originating institution. The computing device receiving 402 a promotion request message, retrieving 404 a merchant promotion, applying 406 a merchant promotion, and transmitting 408 a promotion response occurs in real-time (or near real-time) such that the time between receiving 402 and transmitting 408 may occur in less than a minute (e.g., a few seconds).

Method 400 further includes receiving 410 an authorization message from the mobile device. The authorization message may be received 410 from the mobile device via a text message. In some embodiments, the authorization message may be received from a mobile payment application executed on the mobile device. The authorization message authorizes the push payment transaction in the updated transaction amount. In some cases, the data computing device may receive a cancel message from the mobile device. The cancel message may be associated with the user canceling or declining the updated push payment transaction, thereby stopping the computing device from initiating 412 a transfer of electronic funds. In some embodiments, the authorization message may be routed from the mobile device directly to the originating institution. For example, a user may transmit the authorization message through a mobile payment application executed on the mobile device directly to the originating institution.

Method 400 further includes initiating 412 a transfer of electronic funds. Initiating 412 includes the computing device transmitting the updated push payment transaction to the payment processing network (e.g., payment processing network 128). The payment processing network may then transfer electronic funds from the user's account at the originating institution, in the updated payment amount, to the merchant's account at the receiving institution (e.g., receiving institution 134). In some embodiments, once the funds have been credited to the merchant's account at the receiving institution, the receiving institution may then transmit a confirmation message back to the payment processing network. The payment processing network may then transmit the confirmation message to at least one of the originating institution and/or the computing device. The computing device and/or the originating institution may then transmit the confirmation message to the mobile device via the mobile payment application or via text messaging.

In some embodiments, method 400 includes additional, fewer, and/or alternative steps. For example, in one embodiment, method 400 includes receiving an origination authorization message. The authorization message may be received from the originating institution. In some embodiments, the authorization message may be routed through the mobile device. For example, the originating institution may transmit the authorization message to a mobile payment application executed on the mobile device, and the mobile payment application may transmit the authorization message to the computing device. Originating authorization message may include at least one of an originating institution approval or an originating institution rejection of the push payment transaction. The originating institution rejection may be associated with the originating institution determining that the user's account has insufficient funds to complete the purchase transaction. The originating institution approval message is associated with originating institution determining that there are sufficient funds available in the user's account to complete the push payment transaction The computing device may determine if the authorization message contains an originating institution approval. If the authorization message does not contain an originating institution approval (i.e., the authorization message contains an originating institution rejection) then method 400 may transmit a rejection message to the mobile device via the mobile payment application or via text messaging. The rejection message may indicate to the user that the originating institution has rejected the updated push payment transaction for the updated payment amount (i.e., the user's account contains insufficient funds necessary to complete the updated push payment transaction).

Figure 5:
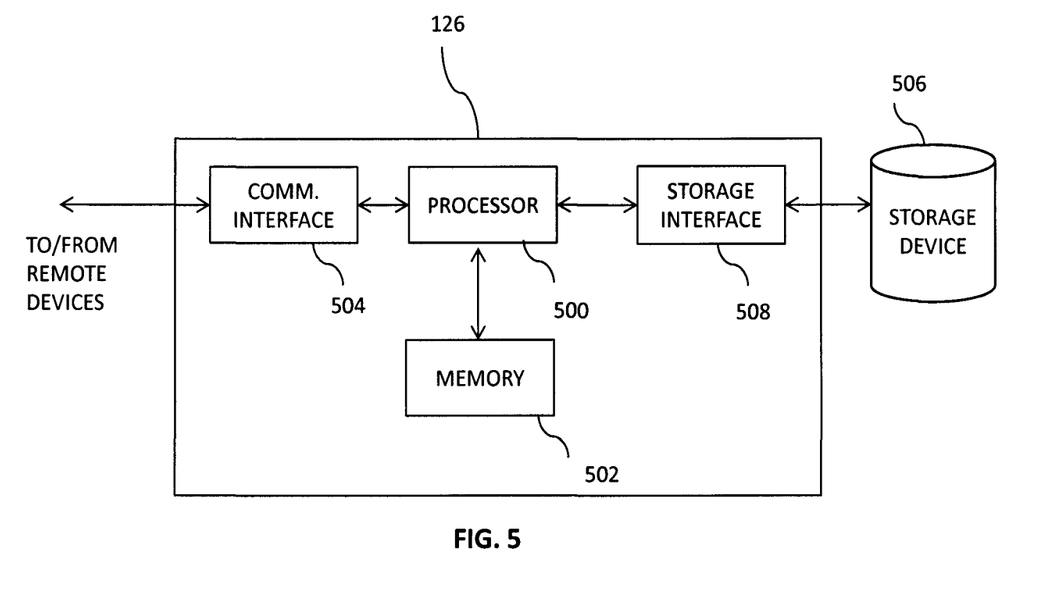
FIG. 5 is a schematic diagram of the push payment computing device used in the process flow shown in FIG. 1.

FIG. 5 illustrates an example configuration of a server computing device, such as push payment computing device 126. Push payment computing device 126 includes a processor 500 for executing instructions. Instructions may be stored to a memory 502. Processor 500 may include one or more processing units (e.g., in a multi-core configuration) for executing instructions. The instructions may be executed within a variety of different operating systems on push payment computing device 126, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 500 is operatively coupled to a communication interface 504 such that push payment computing device 126 is capable of communication with remote devices. Processor 500 may also be operatively coupled to a storage device 506. Storage device 506 is any computer-operated hardware suitable for storing and/or retrieving data (e.g., merchant database 200 FIG. 1). In some embodiments, storage device 506 is integrated in push payment computing device 126. For example, push payment computing device 126 may include one or more hard disk drives as storage device 506. In other embodiments, storage device 506 is external to push payment computing device 126. For example, storage device 506 may include multiple storage units such as hard disks or solid state disks in a redundant array of inexpensive disks (RAID) configuration. Storage device 506 may include a storage area network (SAN) and/or a network attached storage (NAS) system.

In some embodiments, processor 500 is operatively coupled to storage device 506 via a storage interface 508. Storage interface 508 is any component capable of providing processor 500 with access to storage device 506. Storage interface 508 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 500 with access to storage device 506. Memory 502 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
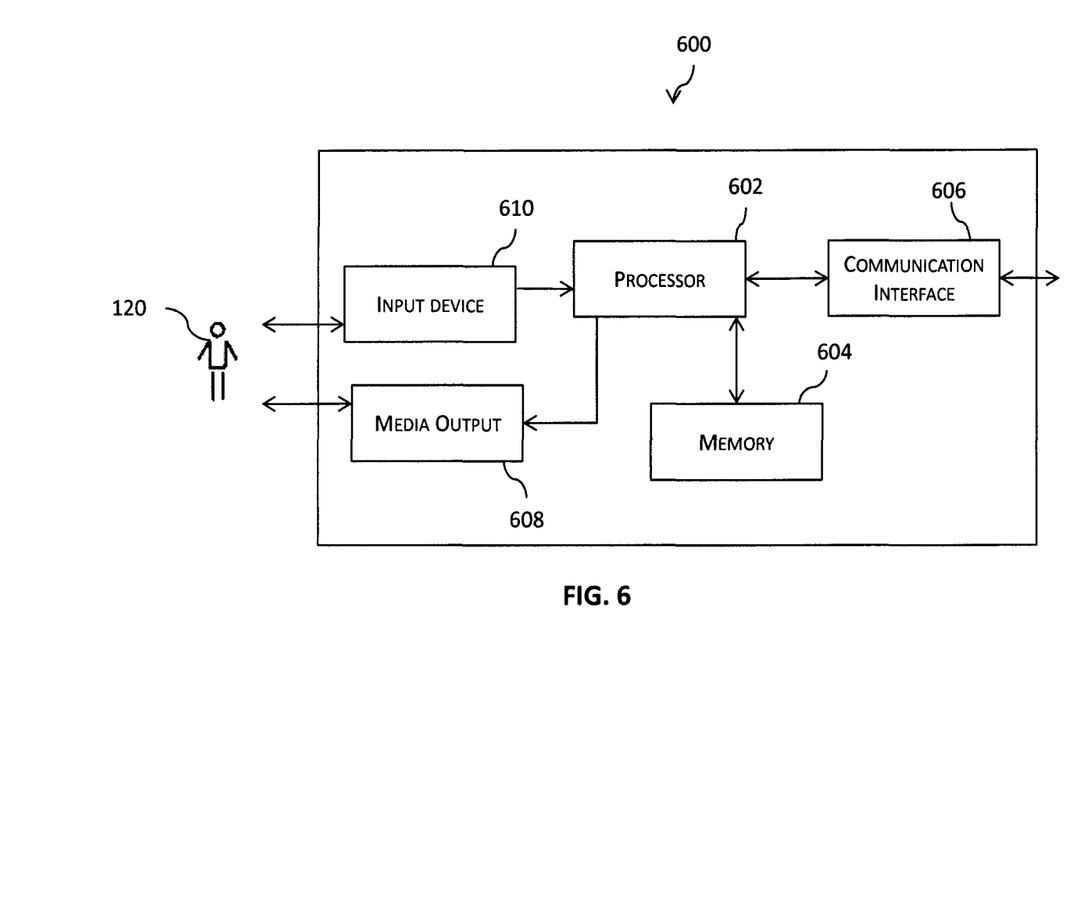
FIG. 6 is a schematic diagram of a user computing device used in the process flow shown in FIG. 1.

FIG. 6 is a schematic diagram of components of a user computing device 600 (e.g., mobile device 122, as shown in FIG. 1) configured to transmit messages to a computing device (e.g., push payment computing device 126). In the example embodiment, user computing device 600 includes a processor 602 for executing instructions. In some embodiments, executable instructions are stored in a memory 604. Processor 602 may include one or more processing units, for example, a multi-core configuration. Memory 604 is any device allowing information such as executable instructions and/or written works to be stored and retrieved. Memory 604 may include one or more computer readable media.

User computing device 600 also includes at least one media output component 608 for presenting information to user 120, shown in FIG. 1. Media output component 608 is any component capable of conveying information to user 120. For example, media output component 608 may be a display component configured to display component lifecycle data in the form of reports, dashboards, communications, and the like. In some embodiments, media output component 608 includes an output adapter such as a video adapter and/or an audio adapter. An output adapter is operatively coupled to processor 602 and operatively connectable to an output device, such as a display device, a liquid crystal display (LCD), organic light emitting diode (OLED) display, or "electronic ink" display, or an audio output device, a speaker or headphones.

In some embodiments, user computing device 600 includes an input device 610 for receiving input from user 120. Input device 610 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component, such as a touch screen, may function as both an output device of media output component 608 and input device 610. A single component, such as a touch screen, may function as both an output device of media output component 608 and input device 610. User computing device 600 may also include a communication interface 606, which is communicatively connectable to a remote device such as server system. Communication interface 606 may include, for example, a wired or wireless network adapter or a wireless data transceiver for use with a mobile phone network, Global System for Mobile communications (GSM), 3G, or other mobile data network or Worldwide Interoperability for Microwave Access (WIMAX). Communication interface 606 may facilitate receiving and transferring of messages (e.g., text messages) between user computing device 600 and the merchant and/or the push payment promotion system.

Stored in memory 604 are, for example, computer readable instructions for providing a user interface to user 120 via media output component 608 and, optionally, receiving and processing input from input device 610. A user interface may include, among other possibilities, a web browser, and client application. Web browsers enable users, such as user 120, to display and interact with media and other information typically embedded on a web page or a website from the server system. A client application allows user 120 to interact with a server application from server system.

As will be appreciated based on the foregoing specification, the above-described embodiments of the disclosure may be implemented using computer programming or engineering techniques including computer software, firmware, hardware or any combination or subset thereof, wherein the technical effect is applying a merchant funded promotion to a push payment transaction, thereby increasing the incentive of the consumer to utilize a push payment transaction at participating merchant. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for applying merchant promotions to a push payment transaction, the computing device comprising a processor and a memory, the processor configured to:

receive, from a mobile device associated with a user, an information request message including a merchant ID;

retrieve, from the memory, a current merchant location of a merchant identified by the merchant ID;

transmit an information response message to the mobile device, the information response message including the current merchant location and a selectable link to navigation instructions to the current merchant location, wherein the information response message is displayed on the mobile device;
receive, from the mobile device at the current merchant location, a promotion request message, the promotion request message including the merchant ID and an initial push payment transaction amount, wherein the user has a user account with an originating institution;
retrieve, from the memory, a merchant record including a merchant promotion associated with the current merchant location identified by the merchant ID, wherein the memory includes a table of merchant records associating enrolled merchant IDs with merchant promotions, wherein the merchant has a merchant account at a receiving institution, and wherein the merchant record is received from at least one of the receiving institution and the merchant;
apply the retrieved merchant promotion to the initial push payment transaction amount to determine an updated transaction amount by generating a set of instructions parsed from the merchant ID contained in the merchant record;
transmit a promotion response message to the mobile device, the promotion response message including the merchant ID, the updated transaction amount, and a funding verification request;
transmit the funding verification request to the originating institution, in real-time, including the updated transaction amount to the mobile device, to confirm availability of funds during the push payment transaction, thereby decreasing the likelihood of a fraudulent purchase transaction;
when the availability of funds is confirmed, receive an authorization message from the mobile device, the authorization message authorizing the push payment transaction having the updated transaction amount; and
initiate a real-time electronic transfer of funds in the updated transaction amount from the user account with the originating institution to the merchant account at the receiving institution by transmitting, to the originating institution over a payment processing network, an authorization request for the real-time electronic transfer of funds corresponding to the updated transaction amount,
when the availability of funds is not confirmed, receive a rejection message from the mobile device, denying the updated push payment transaction having the updated transaction amount.

2. The computing device of claim 1, wherein the merchant record includes a current merchant promotion associated with the merchant.

3. The computing device of claim 1, wherein the merchant is a mobile merchant, and wherein the processor is further configured to:
receive, from the mobile merchant, an updated merchant location that is different from the stored current merchant location;
store the updated merchant location in a merchant record associated with the mobile merchant; and
transmit a second information response message to the mobile device, the second information response message including the updated merchant location a selectable link to navigation instructions to the current merchant location.

4. The computing device of claim 1, wherein the processor is further configured to:
parse the merchant ID from the information request message; and
query the memory for a merchant record associated with the merchant ID to identify the current merchant location.

5. The computing device of claim 1, wherein the processor is configured to receive an approval message from the originating institution, the approval message including at least one of an approval or a rejection, the approval associated with the originating institution determining that the user account has sufficient funds to complete the push payment transaction, and the rejection associated with the originating institution declining the push payment transaction.

6. The computing device of claim 5, wherein the processor is further configured to transmit the approval message to the mobile device.

7. The computing device of claim 1, wherein the processor is further configured to:
receive a confirmation message; and
transmit the confirmation message to the mobile device, wherein the confirmation message includes confirmation that the push payment transaction was successful.

8. The computing device of claim 7, wherein the processor is configured to receive the confirmation message from at least one of receiving institution, originating institution, a payment processing network and the mobile device.

9. A push payment promotion system for applying promotions to push payment transactions, the push payment promotion system comprising:
a database storing a plurality of merchant records associated with a respective plurality of merchants, wherein each merchant has a merchant account with a respective receiving institution, and wherein each of the merchant records includes a merchant ID associated with the respective merchant and a merchant promotion applicable to push payment transactions initiated with the respective merchant;
a computing device communicatively coupled to the database and to a mobile device associated with a user, wherein the mobile device is configured to facilitate a push payment transaction initiated by a user, wherein the user has a user account with an originating institution, and wherein the computing device is configured to:
receive, from the mobile device, an information request message including a merchant ID;
retrieve, from the database, a current merchant location of a merchant identified by the merchant ID;
transmit an information response message to the mobile device, the information response message including the current merchant location and a selectable link to navigation instructions to the current merchant location, wherein the information response message is displayed on the mobile device;
receive, from the mobile device at the current merchant location, a promotion request message, the promotion request message including the merchant ID and an initial push payment transaction amount;
retrieve, from the database, a merchant record including a merchant promotion associated with the current merchant location identified by the merchant ID, wherein the database includes a table of merchant records associating enrolled merchant IDs with merchant promotions, wherein the merchant has a merchant account at a receiving institution, and wherein the merchant record is received from at least one of the receiving institution and the merchant;

apply the retrieved merchant promotion to the initial push payment transaction amount to determine an updated transaction amount by generating a set of instructions parsed from the merchant ID contained in the merchant record;

transmit a promotion response message to the mobile device, the promotion response message including the merchant ID, the updated transaction amount, and a funding verification request;

transmit the funding verification request to the originating institution, in real-time, including the updated transaction amount to the mobile device, to confirm availability of funds during the push payment transaction, thereby decreasing the likelihood of a fraudulent purchase transaction;

when the availability of funds is confirmed, receive an authorization message from the mobile device, the authorization message authorizing the push payment transaction in the updated transaction amount; and initiate a real-time electronic transfer of funds in the updated transaction amount from the user account with the originating institution to the merchant account at the corresponding receiving institution by transmitting, to the originating institution over a payment processing network, an authorization request for the real-time electronic transfer of funds corresponding to the updated transaction amount, when the availability of funds is not confirmed, receive a rejection message from the mobile device, denying the updated push payment transaction having the updated transaction amount.

10. The push payment promotion system of claim 9, wherein the computing device is further configured to:
receive a confirmation message; and
transmit the confirmation message to the mobile device, wherein the confirmation message includes confirmation that the push payment transaction was successful.

11. The push payment promotion system of claim 9, wherein the merchant record includes a current merchant promotion associated with the merchant.

12. The push payment promotion system of claim 9, wherein the merchant is a mobile merchant, and wherein the computing device is further configured to:
receive, from the mobile merchant, an updated merchant location that is different from the stored current merchant location;
store the updated merchant location in a merchant record associated with the mobile merchant; and
transmit a second information response message to the mobile device, the second information response message including the updated merchant location a selectable link to navigation instructions to the current merchant location.

13. The push payment promotion system of claim 9, wherein the computing device is further configured to:
parse the merchant ID from the information request message; and
query the database for the merchant record associated with the merchant ID to identify the current merchant location.

14. The push payment promotion system of claim 9, wherein the computing device is further configured to receive an approval message from the originating institution, the approval message including at least one of an approval or a rejection, the approval associated with the originating institution determining that the user account has sufficient funds to complete the push payment transaction, and the rejection associated with the originating institution declining the push payment transaction.

15. The push payment promotion system of claim 14, wherein the computing device is further configured to transmit the approval message to the mobile device.

16. A non-transitory computer-readable storage medium that includes computer-executable instructions for applying a merchant funded promotion to a push payment, wherein when executed by a computing device comprising a processor in communication with a memory device, the computer-executable instructions cause the processor to:

receive, from a mobile device associated with a user, an information request message including a merchant ID;

retrieve, from the memory device, a current merchant location of a merchant identified by the merchant ID;

transmit an information response message to the mobile device, the information response message including the current merchant location and a selectable link to navigation instructions to the current merchant location, wherein the information response message is displayed on the mobile device;

receive, from the mobile device at the current merchant location, a promotion request message, the promotion request message associated with a push payment transaction initiated by a user and including the merchant ID and an initial push payment transaction amount, wherein the user has a user account with an originating institution;

retrieve, from the memory device, a merchant record including a merchant promotion associated with the current merchant location identified by the merchant ID, wherein the memory device includes a table of merchant records associating enrolled merchant IDs with merchant promotions, wherein the merchant has a merchant account at a receiving institution, and wherein the merchant record is received from at least one of the receiving institution and the merchant;

apply the retrieved merchant promotion to the initial push payment transaction amount to determine an updated transaction amount by generating a set of instructions parsed from the merchant ID contained in the merchant record;

transmit a promotion response message to the mobile device, the promotion response message including the merchant ID, the updated transaction amount, and a funding verification request;

transmit the funding verification request to the originating institution, in real-time, including the updated transaction amount to the mobile device, to confirm availability of funds during the push payment transaction, thereby decreasing the likelihood of a fraudulent purchase transaction;

when the availability of funds is confirmed, receive an authorization message from the mobile device, the authorization message authorizing the push payment transaction in the updated transaction amount; and initiate a real-time electronic transfer of funds in the updated transaction amount from the user account with the originating institution to the merchant account at the receiving institution by transmitting, to the originating institution over a payment processing network, an authorization request for the real-time electronic transfer of funds corresponding to the updated transaction amount, when the availability of funds is not confirmed, receive a rejection message from the mobile device, denying the updated push payment transaction having the updated transaction amount.

17. The non-transitory computer-readable storage medium of claim 16, wherein the computer-executable instructions further cause the processor to:

receive a confirmation message; and transmit the confirmation message to the mobile device, wherein the confirmation message includes confirmation that the push payment transaction was successful.

18. The non-transitory computer-readable storage medium of claim 16, wherein the merchant record includes a current merchant promotion associated with the merchant.

19. The non-transitory computer-readable storage medium of claim 16, wherein the merchant is a mobile merchant, and wherein the computer-executable instructions further cause the processor to:

receive, from the mobile merchant, an updated merchant location that is different from the stored current merchant location;

store the updated merchant location in a merchant record associated with the mobile merchant; and transmit a second information response message to the mobile device, the second information response message including the updated merchant location a selectable link to navigation instructions to the current merchant location.

20. The non-transitory computer-readable storage medium of claim 16, wherein the computer-executable instructions further cause the processor to:

parse the merchant ID from the information request message; and query the memory device for a merchant record associated with the merchant ID to identify the current merchant location.

\* \* \* \* \*